(12) United States Patent
Huh

(10) Patent No.: US 6,389,745 B1
(45) Date of Patent: May 21, 2002

(54) SHEET FOR GROWING GRASS SEEDS AND GRASS SEED MAT USING SAME

(75) Inventor: Kyung Huh, Seoul (KR)

(73) Assignee: G&B Tech Corp., Seoul (KR)

( * ) Notice: Subject to any disclaimer, the term of this patent is extended or adjusted under 35 U.S.C. 154(b) by 0 days.

(21) Appl. No.: 09/514,792

(22) Filed: Feb. 28, 2000

Related U.S. Application Data

(60) Provisional application No. 60/122,239, filed on Feb. 26, 1999.

(51) Int. Cl.⁷ .............................................. C09K 17/00
(52) U.S. Cl. ................. 47/56; 47/9; 47/1.01 F
(58) Field of Search .................. 47/56, 65.9, 58.1, 47/1.01 R, 9, 64

(56) References Cited

U.S. PATENT DOCUMENTS

| | | |
|---|---|---|
| 3,557,491 A | 1/1971 | Franklin |
| 3,890,910 A | 6/1975 | Angruner |
| 4,190,981 A | 3/1980 | Muldner |
| 4,357,780 A | 11/1982 | Ball |
| 4,572,700 A | 2/1986 | Mantarro |
| 4,882,208 A | 11/1989 | Breitscheidel |
| 5,274,951 A | 1/1994 | Besing |
| 5,644,998 A | 7/1997 | Krolik |
| 5,765,304 A | 6/1998 | Clark |
| 5,802,763 A | 9/1998 | Milstein |
| 5,860,245 A * | 1/1999 | Welch ........................... 47/56 |
| 5,934,011 A * | 8/1999 | Ishioka et al. ............... 47/1.01 |
| 6,051,317 A * | 4/2000 | Brueggemann et al. ...... 47/1.01 |

\* cited by examiner

Primary Examiner—Charles T. Jordan
Assistant Examiner—Judith A. Nelson
(74) Attorney, Agent, or Firm—Goodwin Procter LLP; Brian L. Wamsley, Esq.

(57) ABSTRACT

A sheet for sprouting of grass seed and for safeguarding early grass growth and an improved mat containing such sheet for growing lawns or other vegetation on soil. The sheet for sprouting of grass seeds has an upper layer of a transparent vinyl plastic or polyethylene which has a plurality of specifically sized ventilation openings. The ventilating openings are varied, depending upon the sowing season of the grass seeds, from approximately 3.5 cm to 4.5 cm distance apart, and 9 mm to 15 mm in diameter. A plurality of sheets exist below the vinyl sheet and a comprised of a viscous cellulose fiber sheet, a planting sheet containing the seeds and fertilizer and a fibrous ground protective sheet. Optionally, a further sheet may be added for weed or insect control, and some of the sheets may be in combined form.

14 Claims, 3 Drawing Sheets

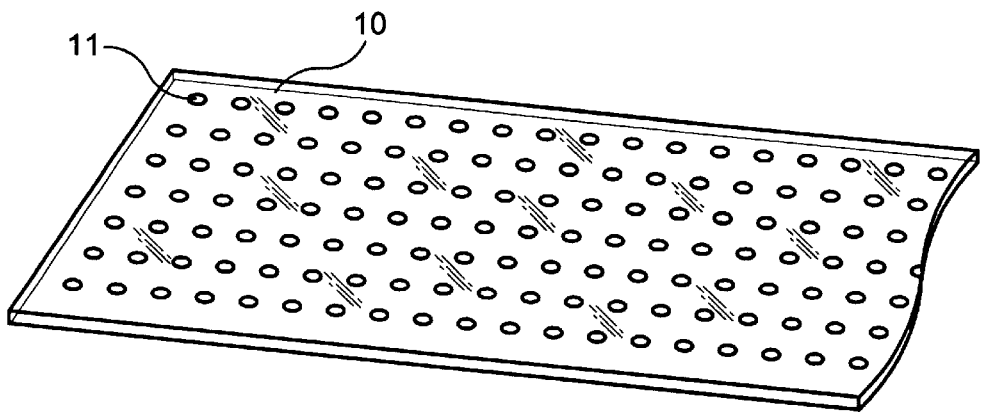
F I G. 1
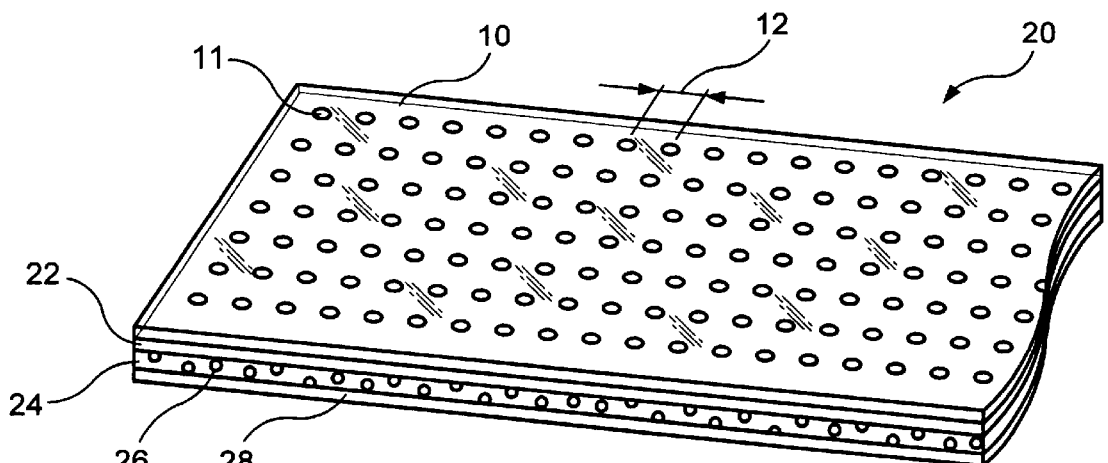
F I G. 2
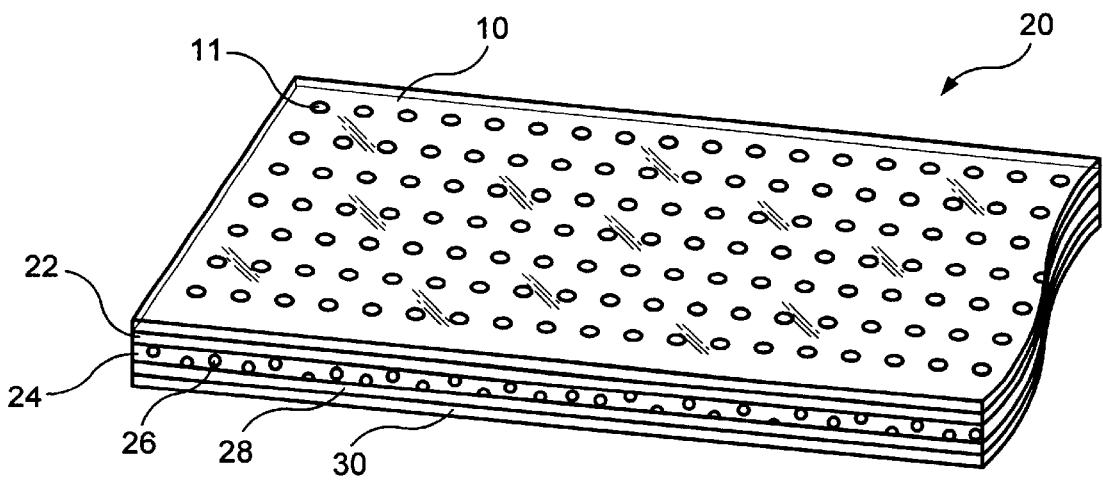
F I G. 3

SHEET FOR GROWING GRASS SEEDS AND GRASS SEED MAT USING SAME

This application is based on a provisional patent application filed under 37 C.F.R. §1.53(b)(2), Ser. No. 60/122, 239 filed Feb. 26, 1999. The disclosure and information contained therein is incorporated here by reference.

BACKGROUND OF THE INVENTION

The present invention relates to a sheet for sprouting grass seed and for safeguarding early grass growth and, more particularly, to an improved mat for growing lawns or other vegetation on soil. The seed sprouting sheet is made up of a vinyl plastic film with ventilation openings of a certain size and spacing. The ventilating holes, depending upon the grass sowing season are, optimally, approximately 3.5 cm to 4.5 cm apart and 9 mm to 15 mm in diameter.

For grass seeds to sprout in a secure environment adequate temperature and appropriate moisture on the surface or upper part of the ground has to be maintained. For the safe growth of young grass, warm temperatures have to be maintained for about six to seven weeks. Normally, the sowing season for grass seeds is from Spring to Summer. Thus, the sowing of grass seed is carried out when ground temperatures are lower than the required temperature for grass seed sprouting and young grams growth.

Grass seed is mainly sown by hand seeding and by a method known as "hydro-seeding." According to the hydro-seeding method, grass seeds are mixed in a dissolved fiber solution and are dispersed on the surface of the ground. In order to properly maintain the humidity on the soil surface for sprouting and growing new grass, continuous irrigation must be supplied. Where sloped surfaces are sown by the hydro-seeding method, the seeds along with the soil tend to be eroded by irrigation or rainfall and collect at the bottom of the slope. Consequently, the grass seeds do not sprout uniformly.

Alternatively, a mat can be placed on top of the sown grass to keep them warm and moist. Mats, however, do not solve the problem of soil erosion caused by rainfall or irrigation when planting grass seeds on slopes, hills or inclines. Because of this the grass seeds can not grow safely and uniformly.

Many forms of mat or carpet products which are intended for growing lawns and other forms of vegetation have been known in the art. These products have not gained acceptance due to failures in some aspect of their design. Often made of fibrous materials and mulching material mixed with seeds to be germinated, these compositions generally expand upon watering, causing the mulch material to break the adhesive bond with the fibrous structural material. The result is that the mat is broken down quite rapidly and large parts of it may be washed away. Further, many of the prior art mats fail to properly protect the seeds during germination and sprouting, exposing them to birds, wind and rain.

Prior art mats that are designed to prevent early mat degradation caused by watering still do not provide the benefits of the present invention. For example, U.S. Pat. No. 4,190,981 to Muldner discloses a laminated mat having a base sheet of water pervious web material, a bed of seeds and compressed peat particles as a middle layer, and an upper layer comprising a fibrous, porous veil. However, the upper layer is not designed to hold and maintain moisture levels nor is it shown to elevate ground temperatures to sprout and protect young grass seedlings. Mats of this type have also been known to be bulky and heavy. However, light-weight mats are also known. See, e.g., U.S. Pat. No. 5,765,304 to Clark. But unlike the present invention, Clark is directed to a mat where grass seeds are germinated, and the mat is then transferred, in the manner of sod, to a soil location once the seeds have sprouted.

It is therefore an object of the present invention to provide an improved grass seed mat to facilitate safe sprouting of grass and growth of young grass. It is also an object of the present invention to provide a grass seed mat that will enhance and maintain soil temperature to promote grass seed germination and growth. It is a further object of this invention to provide a grass seed mat having precise ventilation to control moisture as well as temperature. Other objects of the present invention include providing an improved grass seed mat to facilitate seeding of problem areas such as steep slopes, a grass seed mat of light weight and one that is easy and less costly to install.

SUMMARY OF THE INVENTION

In accordance with the above objects, the grass seed mat of the present invention generally stabilizes soil and reduces watering requirements while raising seedbed temperature to promote germination. The mat tends to keep the soil surface and upper soil layer in the range of about 26° C. to 35° C. and to supply adequate moisture and ventilation for the green seeds. The mat comprises a transparent vinyl sheet on its upper surface to control temperature and moisture. Preferably constructed of polyethylene (PE), the vinyl sheet used to cover the sprouting grass seeds has been found to maintain the soil surface and upper soil layer at just below 35° C., even when the outside air temperature may fall to 20° C. or 30° C. But in the daytime, however, soil surface temperatures could rise to as high as 65° C. to 70° C. As a result the temperature between the ground surface and the vinyl sheet rises as well, causing the young grass to grow slender and weak, or become "sunburned." To moderate the effect of high temperatures, the vinyl sheet contains perforations of variable size and spacing to provide appropriate ventilation depending on soil and climatic conditions. These perforations, which also control moisture and evaporation thus reducing watering requirements, can be in the range of 6 mm to 18 mm, and are generally spaced apart 3.0 cm to 6.0 cm.

The construction of the mat of the present invention includes a base sheet of a carpet-like fabric which contains the grass seeds, or any type of plant or vegetable seeds, placed at certain intervals for maximum results. The base sheet also includes coated, polymer-type starter fertilizer and biodegradable, non-toxic adhesive for bonding the base sheet to a middle sheet of semi-transparent natural viscous cellulose fiber. The middle sheet is bonded to the top, vinyl sheet. A decomposing slow release fertilizer may be incorporated into the vinyl top sheet. All three sheets decompose by micro-organisms within six weeks, and should be stapled to the ground using biodegradable staples to secure against heavy winds and rain.

In some embodiments, the base sheet and middle sheet may be formed together as one layer, which is then bonded to the vinyl top sheet. In addition, a fibrous ground sheet may be added below the base sheet for the purpose of weed control. Further embodiments include additional sheets for weed and/or insect control.

The sowing method in accordance with this invention is to pick out the stones, tree roots and other foreign material and to make the ground flat and even. Next, the grass seed mat with vinyl sheet containing ventilation openings is spread out on the ground. The sheet containing grass seed, fibrous material and fertilizer comes into contact with the ground. Water is then added by sprinkling to thoroughly wet the grass seed mat, causing the mat to more uniformly and completely contact and adhere to the soil surface.

BRIEF DESCRIPTION OF THE DRAWINGS

The above objects and advantages of the invention will become manifest to one skilled in the art from considering the following detailed description of an embodiment of the invention in light of the accompanying drawings, in which:

FIG. 1 is a perspective view of the grass seed sprouting sheet;

FIG. 2 is a perspective view of the grass seed sprouting mat;

FIG. 3 is an embodiment of the grass seed sprouting mat of FIG. 2,

DETAILED DESCRIPTION OF THE INVENTION

Figure 4:
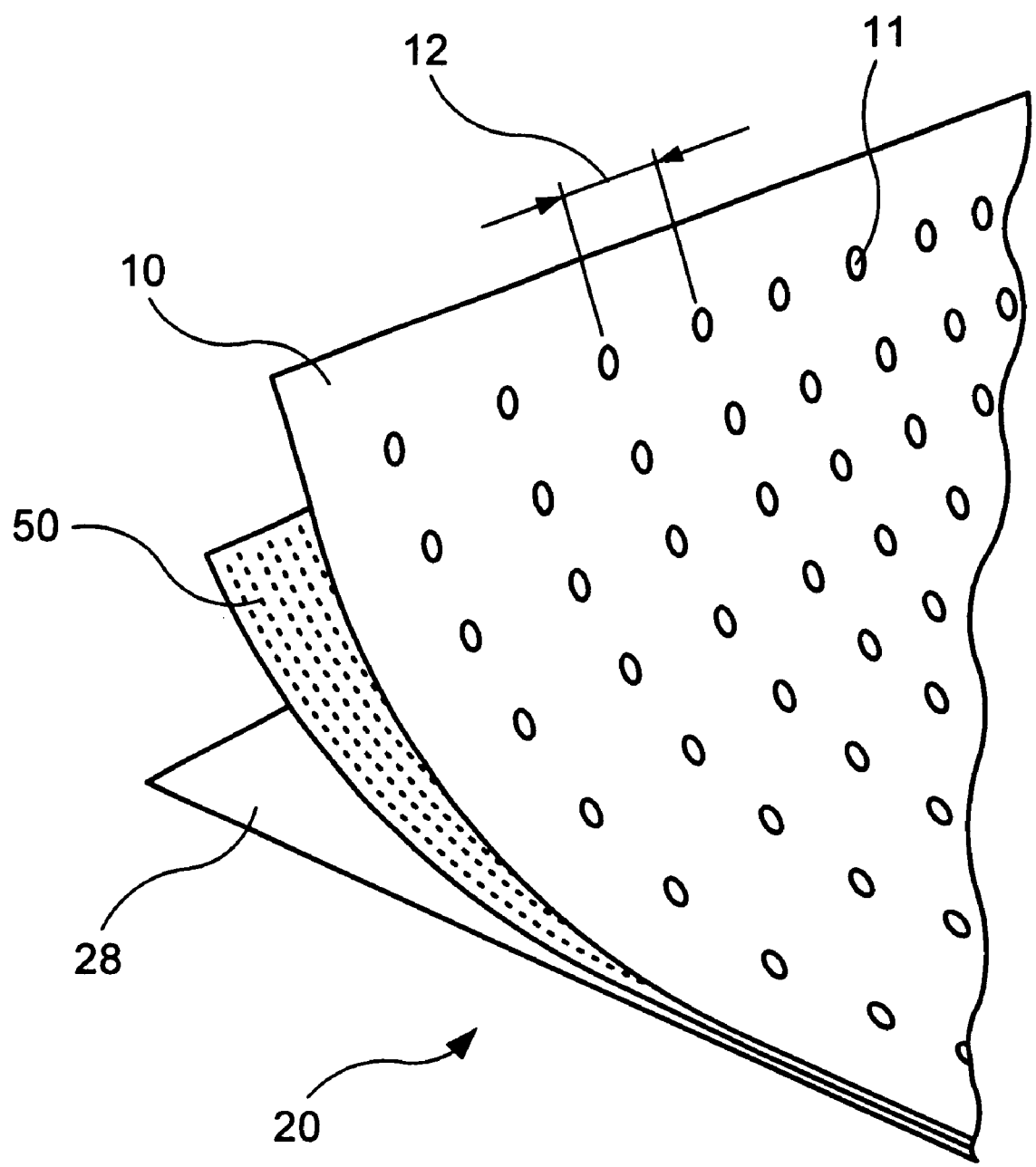
FIG. 4 is a further, preferred embodiment of the grass seed sprouting mat.

The present generally comprises a mat-like laminated structure 20, as shown in FIG. 2, which is designed to elevate seedbed temperatures to speed germination while stabilizing the soil and controlling moisture to reduce watering requirements. The mat 20 comprises laminated sheets of select materials including a vinyl top sheet 10 made preferably of transparent resin having good light transmission properties. FIG. 1 illustrates the grass seed sprouting sheet 10 of the invention with pre-formed ventilation openings or perforations 11. The sheet 10 can be made of any appropriate transparent vinyl or plastic, although plastics that readily degrade over a period of about six weeks are preferred. Of those materials, agricultural polyethylene ("PE"), of a thickness of about 0.03 mm is ideal. When the grass seed mat is to be used in a windy area, a sheet of 0.04 mm thickness is preferred, In some embodiments, a decomposing slow-release fertilizer may be incorporated into the plastic.

The ventilation openings 11 can be of any size or spacing interval depending on the use, climate or weather conditions, or time in the growing season in which the grass is to be planted. However, it has been found that certain sizes of openings are more desirable than others. For example, if the openings 11 are too small not enough rain or water may pass through to the seeds. Conversely, small openings may not provide sufficient ventilation, allowing temperatures to rise, and may even trap too much moisture causing the seeds to rot. If, on the other hand, the openings are too large, too much water may be allowed and appropriate temperature and moisture control may be compromised. Larger openings also can lead to the tearing of the mat on days when there is strong wind. Thus it has been determined that the ventilation openings 11 are ideally in the range of about 8 mm to about 18 mm in diameter, where a diameter of about 9 mm is preferred.

The spacing intervals 12 of the ventilation openings 11 is also important. Such intervals 12 are selected largely according to the growing season and have been found to be most beneficial when in the range of about 3 cm to about 5 cm interval, depending upon the length of the sowing season. For example, when the grass seed is ideally sown in the Spring, an interval 12 of 4.5 cm, is preferred due to the longer growing season. In Summer, it is desirable to have an interval of 3.5 cm.

Charts 1 and 3 illustrate the basis on which the size of the ventilation openings 11 and the spacing interval 12 are selected. Chart 1 shows the experimental result of grass seed sprouting when vinyl sheets 10 having ventilation openings 11 of 8 mm, 9 mm or 10 mm respectively were used to cover ground where grass seed was sown.

Chart 1 shows that the vinyl sheet 10 with the ventilation openings 11 of 8 mm diameter allows the temperature at the soil surface to rise too high, killing a significant amount of the new grass. On the other hand, for the vinyl sheets 10 with 9 mm or 10 mm diameter ventilation openings 11, grass seed sprouting was not as good as originally hoped for because not enough moisture passed through to the lower grass seed level.

CHART 1.

| Opening Size (ψ/mm) | Sprouting From Natural Conditions (Under bad conditions) | Remarks |
| --- | --- | --- |
| 8 | Approx. hole size of 14 mm the grass will be lost | |
| 9 | Diameter of 15 mm the grass will not sprout | Opening size of 9 mm is optimal |
| 10 | Under 16 mm grass will not sprout | |

Furthermore, the vinyl sheet 10 with 10 mm diameter ventilation openings 11 resulted in poorer grass seed sprouting. The conclusion drawn from this data is that vinyl sheets 10 with ventilation openings 11 of less than 7 mm, both grass seed sprouting and young grass growth are disfavored because soil surface temperatures tend to rise to excessive levels. Further, for the vinyl sheets 10 having ventilation openings 11 of larger than 11 mm diameter, early grass seed sprouting and growth is even worse as the moisture in the soil and at the soil surface becomes drastically reduced. Thus, the vinyl sheet 10 with ventilation openings 11 of 9 mm diameter becomes preferred.

Chart 2 compares grass seed sprouting results where the intervals 12 between the ventilation openings 11 are varied.

CHART 2.

| Interval Distance (cm) | Condition at Sprouting |
| --- | --- |
| 3 × 3 and under | Air circulation and moisture worsens, no sprouting. |
| 5 × 5 and over | Moisture is good but no sprouting due to high temperatures |

If the intervals 12 of the ventilation openings 11 are more than 5 cm×5 cm, adequate moisture levels are well maintained, but young grasses get burned because of high temperatures. On the other hand, it has been determined that if the intervals 12 of the ventilation openings are less than 3 cm×3 cm the ventilation is good but the moisture levels are unacceptably low.

Chart 3 tabulates experimental results on grass seed sprouting and young grass growth where both the size of the ventilation openings 11 and the intervals 12 between the ventilation openings 11 are tested during different growing seasons. Through Chart 3 we observe that ventilation openings 11 of 9 mm give the best result. We also observe the ideal intervals 12 between the ventilation openings 11 for grass seed sprouting is 4.5 cm for Spring 4.5 cm and 3.5 cm for Summer.

CHART 3.

Optimal Planting Time and Hole Interval

| Hole Size (ψ/mm) | Spring (late March) | Summer (late June) | Stability | Remarks |
|---|---|---|---|---|
| 7 | 4.0 × 4.0 | 3.0 × 3.0 | C | |
| 8 | 4.0 × 4.0 | 3.0 × 3.0 | B | |
| 9 | 4.5 × 4.5 | 4.5 × 4.5 | A | Best result |
| 10 | 5.0 × 5.0 | 4.0 × 4.0 | B | |
| 11 | 5.0 × 5.0 | 4.0 × 4.0 | C | |

The experimental results presented here demonstrate that the grass seed sprouting sheets 10 having select sizes of ventilation openings 11 together with adequate intervals 12 provide improved ventilation and uniform moisture control which promotes even grass growth. The grass seed sheet 10 of this invention adequately maintains temperature and humidity on the soil surface and above the surface where grass seed is sown. The grass seed sprouting sheet 10 allows grass germination to safely proceed and young grass to safely grow. The sheet 10 will not be torn by the rain and the wind as the ventilation openings 11 are used for air outlets and installation is possible even on windy days. Furthermore, the grass seed sheet 10 will help grass seed sown on steep slopes preventing soil erosion.

Other studies demonstrate the effectiveness of the transparent PE grass seed sheet 10 of the present invention with respect to elevating soil surface and subsurface temperatures. For example, one study conducted from July to September compared the percentage of turf coverage produced using the grass seed sheet, while varying the diameters of the ventilation openings and intervals between the openings, with "uncovered" grass seeded soil. Soil temperatures were measured at 1 inch and 2 inch depths for each combination of these variable factors. The results were also rated with respect to the percent of soil coverage produced and the amount of "leaf burning" caused by overly high temperatures. The study was conducted on 0.5 m×0.5 m plots, using Zoysia grass at 3 g/m2. Four replications were performed, the results of which are shown in Chart 4. The study shows unequivocally that the size of the ventilation openings and the intervals between them result in elevated sol temperatures. For at least the grass tested, 8 mm ventilation openings spaced at 3.0 cm to 4.0 cm intervals produced superior turf coverage results.

FIG. 2 illustrates the grass seed sprouting mat 20 of the invention. A middle sheet 22 comprised of semi-transparent viscous cellulose fiber is formed directly beneath the upper vinyl sheet 10. Intermediate or starter fertilizer may also be added to the viscous fiber sheet 22. The vinyl sheet 10 contains ventilation openings 11, and is composed of polyethylene with a thickness of approximately 0.03 mm to 0.04 mm. The viscous fiber sheet 22 also contains adhesive and functions to bind the vinyl sheet 10 to a lower planting sheet 24 containing the grass seed 26. When wet, fiber sheet 22 adheres mat 20 to the ground much like an adhesive. Complete contact between mat 20 and the ground facilitates grass root growth from the mat 20 directly to the soil. The adhesive material in fiber sheet 22 is readily dissolved by moisture and is non-toxic. Chemically, the adhesive material used in fiber layer 22 can be formulated by replacing the acetate radical with hydroxyl radical. This synthesis, including approximately 10% of ester groups, is used so that it could be easily dissolved.

Grass seed 26 is sprinkled within a planting sheet 24 located below the viscous fiber sheet 22. The planting sheet 24 keeps the grass seed 26 warm and moist to promote sprouting and also helps adhere the grass seed 26 to the soil. The planting sheet 24 is composed of a mixture of easily dissolvable or reducible fiber such as coconut dust or paper sludge, etc. To be more specific, plantation sheet 24 is brought forth with components such as viscous fiber,

CHART 4.

| Treatment | | Turf | Soil Temperature (° C.) | | Leaf |
|---|---|---|---|---|---|
| Diam. (mm) | Interval (cm) | Coverage (%) | 1 inch depth | 2 inch depth | Burning 0 = no burn |
| Uncovered | | 38.3 | 37.9 | 35.1 | 0 |
| No Ventilation Holes | | 53.3 | 46.1 | 42.9 | 3.0 |
| 8 mm | 3.0 cm | 68.3 | 39.8 | 37.6 | 0.6 |
| | 3.5 | 61.7 | 42.1 | 39.0 | 1.3 |
| | 4.0 | 66.7 | 42.5 | 40.0 | 2.0 |
| | 4.5 | 61.7 | 42.4 | 40.0 | 1.3 |
| | 5.0 | 56.7 | 42.4 | 40.3 | 0 |
| | 6.0 | 55.0 | 43.3 | 41.1 | 1.0 |
| 9 mm | 3.0 cm | 58.3 | 40.2 | 38.2 | 1.0 |
| | 3.5 | 51.7 | 40.8 | 38.8 | 1.0 |
| | 4.0 | 55.0 | 39.9 | 38.0 | 1.3 |
| | 4.5 | 56.7 | 37.7 | 36.3 | 0 |
| | 5.0 | 51.7 | 42.3 | 40.7 | 0.3 |
| | 6.0 | 51.7 | 43.6 | 41.5 | 0.3 |
| 10 mm | 3.0 cm | 50.0 | 37.6 | 36.5 | 0 |
| | 3.5 | 51.7 | 38.4 | 37.2 | 0.3 |
| | 4.0 | 53.3 | 37.3 | 36.5 | 0.3 |
| | 4.5 | 56.7 | 39.0 | 37.3 | 1.3 |
| | 5.0 | 55.0 | 38.8 | 37.7 | 0.3 |
| | 6.0 | 58.3 | 39.6 | 38.3 | 1.3 | coconut dust, or paper sludge which are dissolved into liquid and applied to the underside of the vinyl sheet 10. Its application to the vinyl sheet forms the planting sheet 24. The grass seed 26 are sprinkled on the bottom of the planting layer 24 with certain intervals. The grass seed 26 can be applied in any amount depending on the grass coverage required. Generally, about 3 gms/m to 9 gms/m are used, with about 6 gms/m being preferred. The actual range of grass seeds used varies greatly depending on the type of seed to be used. Generally, this range is 2–7 pounds per 1,000 square feet of area coverage.

As an alternative, the grass seed 26 can be further sprayed with viscous cellulose fiber, coconut dust, or paper sludge in liquid, forming a protective layer 28 at the lower part of the planting sheet 26. The protective sheet 28 provides support for the planting sheet 24 while preventing grass seed 26 loss by adhering to the planting sheet 24 and grass seed 26. In addition, protective sheet 28 is soluble with moisture and is formed with non-toxic adhesive material.

FIG. 3 illustrates a further embodiment of the invention having a weed control sheet 30 located between the planting sheet 24 and the protective sheet 28. The weed control sheet 30 is formed with selective herbicide for weed removal and for controlling weed germination and growth. For the weed removing sheet 30, weed remover such as Tuper San is added at about 1.2 g/m2 to 2.09 g/m2 per square meter.

The weed control sheet 30 can be combined with an adhesive material sheet when the weed remover and adhesive material forming the protective layer 28 are spread. As a result the adhesive material sheet 22 or the protective material sheet could be formed into a uniform pattern. Thus, the grass seed sprouting mat, including weed remover and insect-remover 30 can promote grass seed sprouting and the growth of early young grass even further.

FIG. 4 illustrates a preferred embodiment of the invention. This embodiment comprises an upper layer of the grass seed sheet 10 with ventilation openings 11 spaced at intervals 12 as described earlier. The middle sheet 50 is composed of semi-transparent viscous cellulose fiber mixed together with grass or other vegetation seed, fertilizer and non-toxic adhesives. Middle sheet 50 functions in a variety of ways, but essentially combines the functions of the viscous fiber sheet 22 and the planting sheet 24. The bottom protective sheet 28 is comprised preferably of fast dissolving wood pulp fiber and serves to protect the grass seed 26 in the above sheet 50 and to ensure uniform contact of the grass seed mat 20 with the soil.

Figure 5:
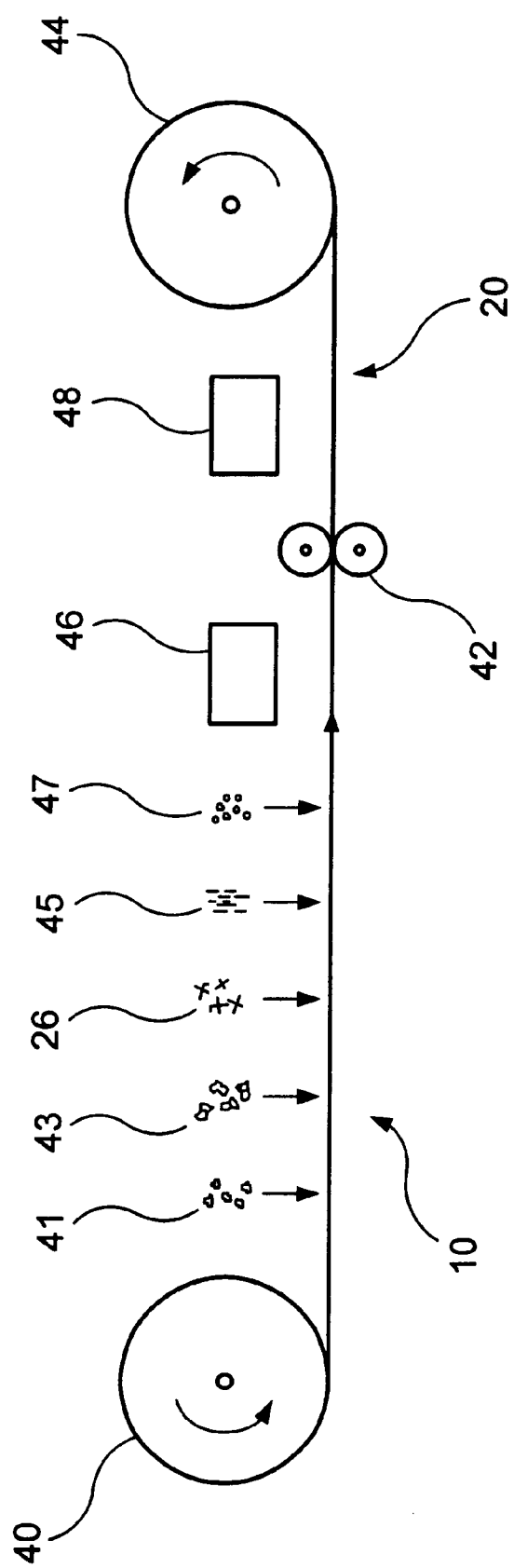
FIG. 5 illustrates the production process of the grass seed mat.

FIG. 5 diagrams the device for manufacturing grass seed mat 20. The manufacturing device of grass seed sprouting mat 20 provides a mat roll 44 to wind the vinyl sheet 10 which is provided via roller 42 from sheet roll 40. The vinyl sheet 10 wound on sheet roll 40 is about 0.03 mm to 0.04 mm thick and formed from polyethylene. The ventilation openings 11 can be pre-formed on vinyl sheet 10 as configured in FIG. 1.

As vinyl sheet 10 proceeds from sheet roll 40 toward roller 42, viscous material 41, fibrous planting material 43, grass seed 26, slow release fertilizer or weed remover 45 and protective material 47 are sprinkled in that order on the surface of vinyl sheet 10. The viscous fiber material layer 22 is formed when viscous material 41 like polyvinylacetate ("PVA"), dissolved in water and applied to the surface of vinyl sheet 10. Fiber, coconut dust, or paper sludge, etc., are easily dissolved by soil microbes and are soluble in water. When a composite of those elements is sprayed over the viscous fiber sheet 24 or applied on its surface, planting sheet 24 is formed. Grass seed 26 is then sprayed on the surface of the planting sheet 24 at certain intervals.

Before reaching roller 44 viscous fiber sheet 22, planting sheet 24, weed and insect control sheet 30 and protective sheet 28 are heated by the first heater 46 at slightly less than 50° C., dried, and then pressed by the roller 42 to a certain thickness and formed into a grass seed mat 10. The mat is dried rapidly by second heater 48 to contain as low as 9% moisture. Mats manufactured by this procedure are of very light weight, weighing only about 13 lbs/per thousand square feet.

Employing the grass seed mat 20 as manufactured above to plant grass seed in a desired area, impure materials such as stones, tree roots, etc., are removed and the ground is prepared to be flat and even. The ground is pressed by rollers so that the grass seed sprouting mat could easily contact and adhere uniformly to the ground. The grass seed sprouting mat is then spread out on the prepared soil surface as in FIGS. 2 and 3. Different sections of the grass seed mat are then joined together by any appropriate means, and a small amount of water is sprayed on the mats, adhering them to the ground. In addition, the grass seed mats may be further secured through the use of biodegradable staples or pins.

Chart 5 compares the result of sowing grass seed in different sowing seasons using the grass seed sheet without ventilation openings, with irregular ventilation openings and with the grass seed mat, with sowing "exposed" grass seeds in different seasons, without vinyl sheet or the grass seed mat.

CHART 5.

| Planting Method Condition/Time (Season) Month/Day | Exposed Seeds | Vinyl Sheet Without Ventilation Holes | With Irregular Ventilation Holes | With Grass Seed Sprouting Mat |
|---|---|---|---|---|
| | Success Rates (%) | | | |
| 4/20 | 13% | 16% | 27% | 83% |
| 5/20 | 17% | 4% | 32% | 86% |
| 6/20 | 28% | 0 | 41% | 89% |
| 7/20 | 31% | 0 | 48% | 91% |

As shown in Chart 5, when only grass seed is sown, grass seed sprouting and growth is not favored by dryness. The grass seed sown using vinyl sheets without ventilation is not favored because young grass withers away because of high temperatures. In contrast, grass seed sown using the grass seed mat of this invention produces a stable sprouting young grass. Indeed, use of the within grass seed mat produced a grass coverage rate of more than 85% compared with an average of 22.5% coverage without the use of the grass seed mat.

While the present invention has been explained in relation to its preferred embodiment, it is to be understood that various modifications thereof will be apparent to those skilled in the art upon reading this specification. The invention disclosed herein is therefore intended to cover all such modifications that fall within the scope of the appended claims.

What is claimed is:

1. An improved laminated mat for growing seed or other vegetation, comprising:
   a lower, planting sheet comprising grass seed or other vegetation seed, fibrous support material and adhesive means for adhering the seeds and support material together and to a middle sheet;
   a middle sheet comprising viscous cellulose fiber and adhesive means, said middle sheet being affixed to said lower sheet and an upper sheet by said adhesive means;
   an upper sheet adhered to said middle sheet, said upper sheet comprising a vinyl sheet containing a plurality of ventilating openings, wherein said ventilating openings have diameters of about 7 mm to about 12 mm and wherein said ventilating openings are spaced apart at intervals of from about 3.0 cm to about 6.0 cm.

2. The laminated mat of claim 1 further comprising a bottom protective sheet comprised of cellulose fiber.

3. The laminated mat of claim 1 wherein the ventilating openings have a diameter of 9 mm.

4. The laminated mat of claim 3 wherein the ventilating openings are spaced apart at intervals of about 4.5 cm.

5. The laminated mat of claim 4 wherein the vinyl sheet is polyethylene.

6. The laminated mat of claim 4 wherein the vinyl sheet is further comprised of a slow release fertilizer.

7. The laminated mat of claim 4 wherein the middle sheet is further comprised of starter fertilizer.

8. The laminated mat of claim 2 further comprising a control sheet positioned between said protective sheet and said planting sheet, said control sheet comprising a fibrous support material and a weed control agent or an insect control agent, or both.

9. The laminated mat of claim 2 wherein said laminated mat is biodegradable and disintegrates in about 6 to about 8 weeks.

10. An improved laminated mat for growing grass or other vegetation, comprising:
- an upper sheet comprising a vinyl sheet have a plurality of ventilating openings, said ventilating openings being spaced apart at intervals of from about 3.0 cm to about 6.0 cm and having diameters of about 7 mm to about 12 mm;
- an intermediate sheet comprising grass or vegetation seed, viscous cellulose fiber and adhesive; and
- a bottom sheet comprising wood or other fiber, wherein said bottom sheet protects said intermediate sheet from damage and loss of seed.

11. The laminated mat of claim 10 wherein said ventilating openings have diameters of about 9 mm and spaced apart at intervals of about 4.5 cm.

12. The laminated mat of claim 10 wherein the upper vinyl sheet is comprised of polyethylene.

13. The laminated mat of claim 12 wherein the vinyl sheet further comprised slow release fertilizer.

14. The laminated mat of claim 10 wherein said intermediate sheet further comprises starter fertilizer.

* * * * *